(12) United States Patent
Casaburo

(10) Patent No.: US 11,170,578 B1
(45) Date of Patent: Nov. 9, 2021

(54) OCCLUSION DETECTION

(71) Applicant: Apple Inc., Cupertino, CA (US)

(72) Inventor: Daniele Casaburo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/077,158

(22) Filed: Oct. 22, 2020

Related U.S. Application Data

(60) Provisional application No. 62/932,663, filed on Nov. 8, 2019.

(51) Int. Cl.
*G06T 19/00* (2011.01)
*G06T 7/55* (2017.01)
*G06T 17/00* (2006.01)

(52) U.S. Cl.
CPC .............. *G06T 19/006* (2013.01); *G06T 7/55* (2017.01); *G06T 17/00* (2013.01); *G06T 2207/20084* (2013.01)

(58) Field of Classification Search
None
See application file for complete search history.

(56) References Cited

U.S. PATENT DOCUMENTS

| 9,478,039 | B1 | 10/2016 | Wang et al. |
| 9,741,125 | B2 | 8/2017 | Baruch et al. |
| 2013/0266190 | A1* | 10/2013 | Wang .................. G06K 9/3258 382/105 |
| 2017/0127046 | A1 | 5/2017 | Das |
| 2018/0197294 | A1* | 7/2018 | Pan ............................ G06T 7/11 |
| 2019/0102886 | A1 | 4/2019 | Guigues |
| 2019/0266789 | A1 | 8/2019 | Rezaiifar et al. |
| 2019/0371072 | A1* | 12/2019 | Lindberg .............. G06T 19/006 |
| 2021/0012560 | A1* | 1/2021 | Zhou ...................... G06T 17/20 |

OTHER PUBLICATIONS

Yuan, Ming-Ze; Gao, Lin; Fu, Hongbo; and Xia, Shihong; "Temporal Unsampling of Depth Maps Using a Hybrid Camera"; IEEE Transactions on Visualization and Computer Graphics, arXiv: 1708. 03760 v2 [cs.GR] Nov. 5, 2018, pp. 1-13.

* cited by examiner

*Primary Examiner* — Frank S Chen
(74) *Attorney, Agent, or Firm* — Thompson Hine LLP

(57) ABSTRACT

Various implementations disclosed herein include devices, systems, and methods that determines changes in depth category of pixels from one image to the next. For example, changes in depth category may include determining that a given pixel has changed from foreground to background or vice versa. The technique is based on creating a histogram or other model using a mask identifying a depth category of pixels in the first image. The histogram or model is used to assess a pixel in the first frame and the second frame and identify a change in its depth category. One use of this technique is to determine a change in occlusion.

18 Claims, 9 Drawing Sheets

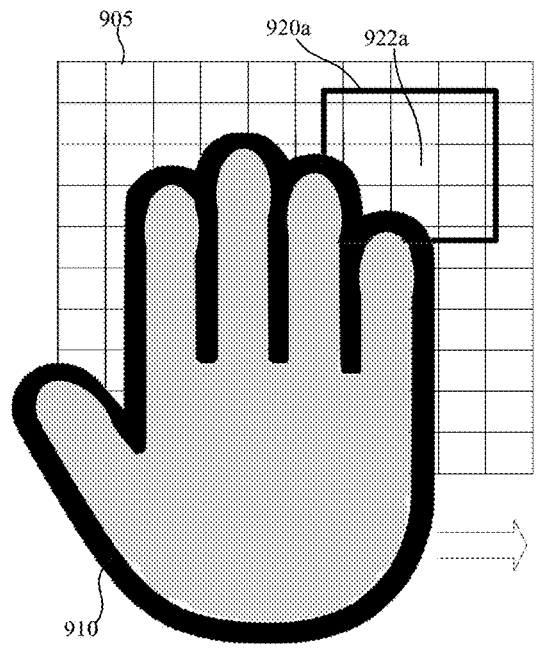 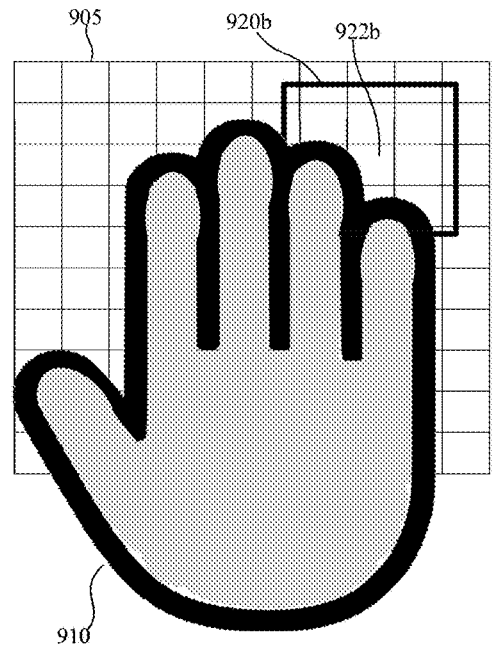
FIG. 9A  FIG. 9B
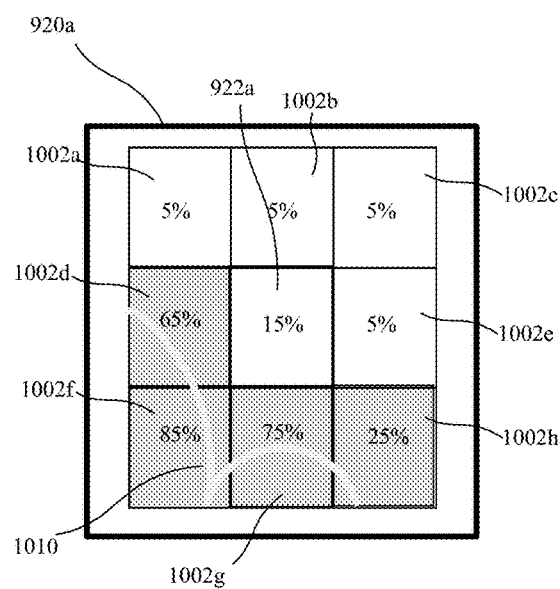 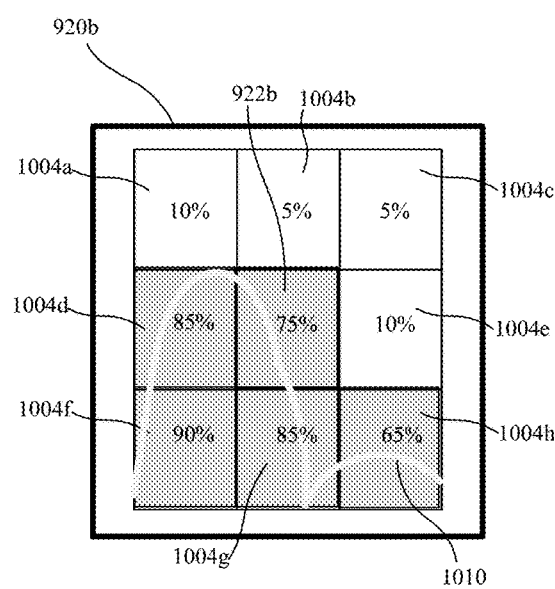
FIG. 10A  FIG. 10B

OCCLUSION DETECTION

CROSS-REFERENCE TO RELATED APPLICATIONS

This Application claims the benefit of U.S. Provisional Application Ser. No. 62/932,663 filed Nov. 8, 2019, which is incorporated herein in its entirety.

TECHNICAL FIELD

The present disclosure generally relates to determining content for images, and in particular, to systems, methods, and devices for providing such content based on images and depth information detected in a physical environment.

BACKGROUND

Content may be provided based on images of a physical environment and depth information detected in the physical environment. For example, an object in the foreground may be displayed on top of a background portion of an image of a physical environment (e.g., a portion of the hand appears in front of a mountain). In this example, the portion of the hand occludes a portion of the mountain. In addition to attenuation of the intended scene, the foreground object may contribute to the reduction of the depth information of the image (e.g., determining whether an area of the image is background or foreground information).

Electronic content may also be provided based on the images of a physical environment and depth information detected in the physical environment. For example, images of a physical environment may be captured and displayed with virtual content added to it, e.g., with the virtual content overlaying portions of the images. The virtual content may be added to the images based on the depths of physical objects that are depicted in the images of the physical environment. For example, a virtual cube may be displayed on top of a portion of an image of a physical environment such that a first portion of the virtual cube appears in front of a mountain of the physical environment and such that a second portion of the virtual cube is not visible because that portion is behind a person's hand of the physical environment. In this example, the first portion of the virtual cube occludes the mountain and the second portion of the virtual cube is occluded by the hand. Determining how to display portions of the virtual cube with respect to any given image may be based on depths determined for objects of the physical environment that are depicted in that image and depths intended for the virtual content.

Existing techniques for providing electronic content based on images of a physical environment and depth information detected in the physical environment may be inaccurate and inefficient. For example, depth information captured by a depth camera may be captured at a different rate than light intensity images captured by an RGB camera. An image captured at a given point in time may not have depth information available for that point of time and thus may be automatically associated with inaccurate/unsynchronized depth information from a prior point in time. Accordingly, the difference in capture rates may result in undesirable or unintended appearances, for example, resulting in occlusions that are inaccurately displayed and other noticeable issues.

SUMMARY

Various implementations disclosed herein include devices, systems, and methods that determine depth category changes based on images of a physical environment, depth information detected in the physical environment, and models that are created. During image composition acquisition, the depth ordering of real and virtual objects should be taken in account in order to have a realistic and physically meaningful composition of the scene (e.g. a scene in which a wide-open hand is waving in front of a virtual object will have parts of the virtual objects visible through the fingers while the rest of the virtual object will be occluded by the hand). Models may be created in the circumstance where a representation of the foreground and the background information is needed as a way to express information between two images (e.g., to detect occlusion changes between two objects in two consecutive images). Specifically, a model (e.g., a probability distribution or histogram) identifies occurrences of pixels associated with a first depth category that have a characteristic (e.g., greyscale value of 1) of a set of characteristics (e.g., greyscale values in the range 0-255). The model may be generated based on a mask of the image (e.g., occlusion masks identifying where the hand occludes a background object, such as a mountain). Changes for a pixel from a first image to a second image are used to identify a change in its depth category (e.g., determine which pixels are now occluded, and which pixels are now revealed).

Some implementations involve a method of determining depth category changes of pixels from a first image to a second image of a physical environment. The method involves obtaining (e.g., receiving or generating) a mask corresponding to at least a portion of a first image of a physical environment, the first image comprising pixels each having a value provided by a camera (e.g., RGB, IR, event-camera, etc.). The mask identifies pixels of the first image that are associated with a first depth category (e.g., foreground or background). The mask may include a mask such as an occlusion mask, a foreground mask, a background mask, a mid-focus-range mask, or the like. Additionally, or alternatively, occlusion masks may be determined, for example, from color segmentation (e.g., the hands color), using real depth thresholding, using people detection, and/or using real depth data in the second sequence of images and virtual depth data in a fourth sequence of images corresponding to virtual content.

The exemplary method further involves generating a model (e.g., a Gaussian mixture model, polynomial representation, parameterized histogram, etc.) based on the first image and the mask. The model may be based on (e.g., representing) occurrences of pixels associated with the first depth category that have a characteristic (e.g., greyscale value 1) of a set of characteristics (e.g., greyscale values in the range 0-255). For example, the model is a histogram representing how many foreground pixels of the first image have greyscale value 1, and how many foreground pixels of the first image have greyscale value 2, etc. In another example, the model is a histogram representing how many pixels of the first image have texture 1, how many foreground pixels of the first image have texture 2, etc., where texture of a pixel is categorized into one of a discrete set of types based on the pixel and its surrounding pixels. In some implementations, other representations are based on a mixture of Gaussians.

The exemplary method further involves determining depth category changes of pixels from the first image to a second image of the physical environment (e.g., determining that a pixel has changed from foreground to background or vice versa) based on pixels of the second image having characteristics of the set of characteristics and the model.

For example, determining depth category changes may include using the model to determine a first probability that a pixel of the first image at a pixel location is associated with the first depth category based on which characteristic the pixel exhibits in the first image (e.g., based on the pixel having greyscale color 1, the model provides a 75% chance the pixel is foreground in the first image). Additionally, determining depth category changes may include using the model to determine a second probability that a pixel in the second image at the pixel location is associated with the first depth category based on which characteristic the pixel exhibits in the second image (e.g., based on the pixel having greyscale color 87, the model provides a 10% chance that the pixel is foreground in the second image). Determining depth category changes may further include determining a depth category change by comparing the first probability to the second probability. For example, comparing 75% probability of one particular pixel location in a first image to 10% probability of the same particular pixel location in a second image indicates that the pixel has changed from foreground to background. In some example implementations, multiple depth categories are assessed and probabilities are determined for each pixel for each category.

In some implementations, the exemplary method further involves determining a probability that a pixel has changed. In particular, determining depth category changes of pixels from the first image to the second image of the physical environment based on pixels of the second image having characteristics of the set of characteristics and the model includes determining, based on the model, a first probability that a pixel of the first image at a pixel location is associated with the first depth category based on which characteristic the pixel exhibits in the first image. For example, based on the pixel having greyscale color 1, the model provides a 75% chance the pixel is foreground in the first image. Determining depth category changes may further include determining, based on the model, a second probability that a pixel in the second image at the pixel location is associated with the first depth category based on which characteristic the pixel exhibits in the second image (e.g., based on the pixel having greyscale color 87, the model provides a 10% chance that the pixel is foreground in the second image). Determining depth category changes may further include determining a depth category change by comparing the first probability to the second probability (e.g., comparing 75% to 10% indicates that the pixel has changed from foreground to background). In some implementations, multiple depth categories may be assessed, and probabilities can be determined for each pixel for each category.

In some implementations, the exemplary method further involves an intensity threshold that pixel intensity has changed (from e.g., 38% to 5%=−33%), where if the pixel intensity changes more than a threshold (e.g., >30%), a depth category has changed. In particular, determining depth category changes of pixels from the first image to the second image of the physical environment based on pixels of the second image having characteristics of the set of characteristics and the model includes determining a pixel intensity value for each pixel location in the first image and the second image, determining, for each pixel location, whether a change occurs in pixel intensity value from the first image to the second image, and determining, for each pixel location, whether a depth category changes from the first depth category to a second depth category based on whether the change in the pixel intensity value exceeds a pixel intensity threshold. For example, if pixel intensity has changed for a particular pixel location (e.g., from 38% to 5%=−33%) more than a threshold (e.g., >30%), it would be determined that a depth category has changed (e.g., from foreground to background or vice versa).

In some implementations, the first image and the second image each include a plurality of pixel locations. For example, each pixel in the first image and each pixel in the second image are located at one of the plurality of pixel locations. In some implementations, pixel locations in the first image are spatially correlated and are aligned with pixel locations in the second image.

In some implementations, determining depth category changes of pixels from the first image to a second image of the physical environment may further include determining which pixels change in the second image compared to the first image from pixel occlusion to pixel reveal, and pixel reveal to pixel occlusion.

In some implementations, the exemplary method further involves dividing each image frame into 4, 6, 8+ windows, and developing a histogram or other model for each window. In particular, the exemplary method further includes generating the model based on the first image and the mask by identifying, for the first image, a plurality of windows, wherein each window in the first image is spatially correlated and is aligned with a corresponding window in the second image, and generating a model for each window in the first image. In some implementations, adjacent windows can be overlapping by a certain amount of pixels or by a certain percentage of pixels. Alternatively, adjacent windows do not overlap pixels between adjacent windows.

In some implementations, the exemplary method further involves classification-based machine learning to generate the model. In particular, the exemplary method further includes generating the model based on the first image and the mask by identifying the occurrences of pixels associated with the first depth category that have a characteristic of the set of characteristics and the relationships between the pixels using a machine learning model that uses a representation of the first image and the mask as input. In some implementations, the machine learning model is a neural network (e.g., an artificial neural network), decision tree, support vector machine, Bayesian network, or the like.

In some implementations, the images provided are presented in a computer-generated reality (CGR) environment to a user while the user is in a physical environment, and electronic content is provided based on light and depth information about a physical environment and light and depth information about virtual content. Thus, in addition to images corresponding to light intensities of a physical environment (e.g., RGB camera frames), some implementations receive images corresponding to light intensities of virtual content (e.g., RGB frames for the virtual content). The virtual content information may be used in determining the mask data that is used by the methodology described herein. For example, the mask data may include an occlusion mask that identifies an area of the virtual content depicted in an image (e.g., an RGB image of virtual content) that is occluded by an area of the physical environment depicted in a corresponding image (e.g., an RGB image of the physical environment).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 9A-9B are block diagrams illustrating example images at an occlusion boundary region according to certain implementations.

FIG. 10A-10B are block diagrams illustrating a closer view of the example images of FIGS. 9A-9B according to certain implementations.

Figure 1:
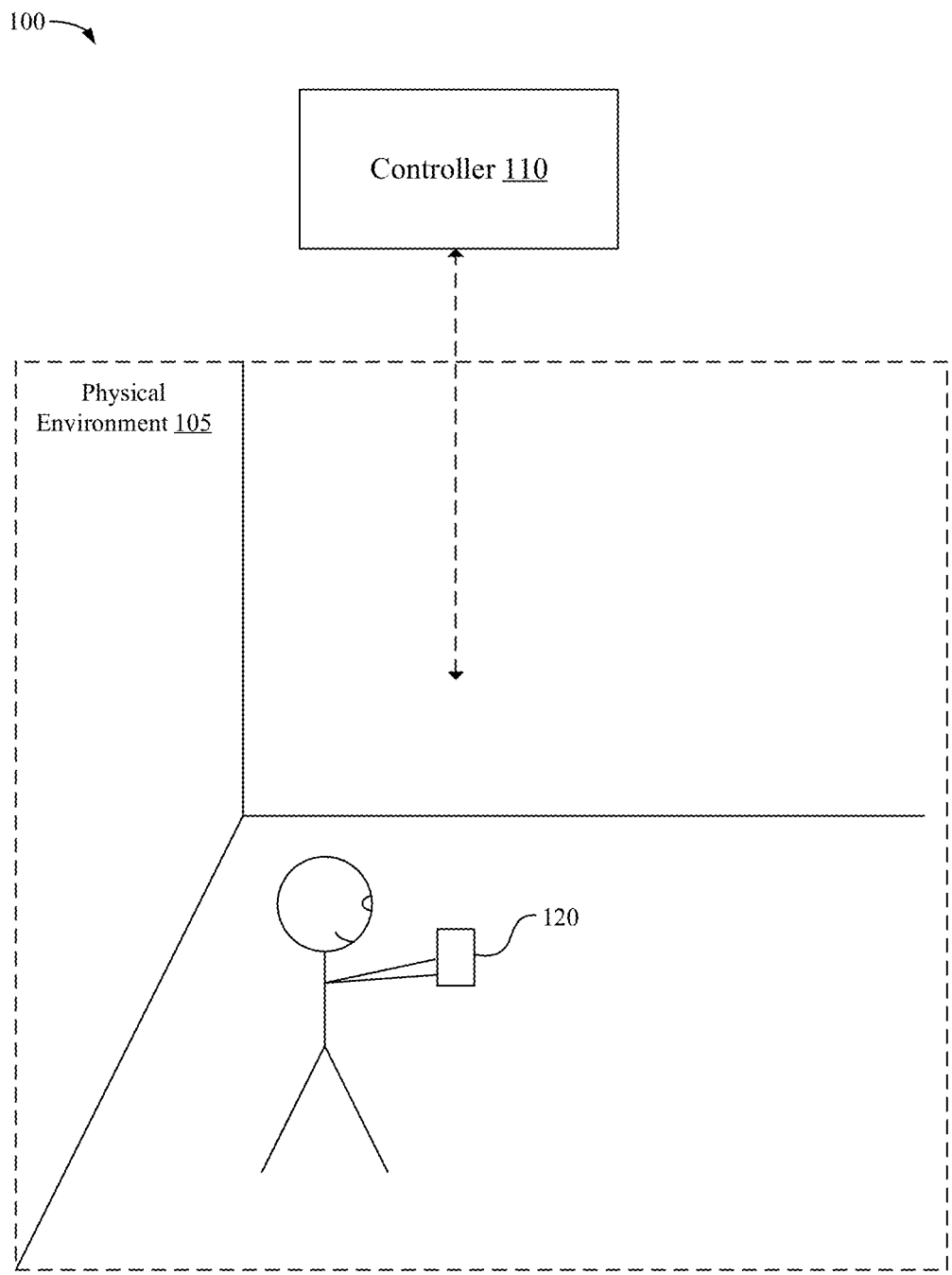
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120.

In some implementations, the controller 110 is configured to manage and coordinate an experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the controller 110 are provided by and/or combined with the device 120.

According to some implementations, the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105

(e.g., RGB, depth, and the like) that is utilized with the imaging process techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
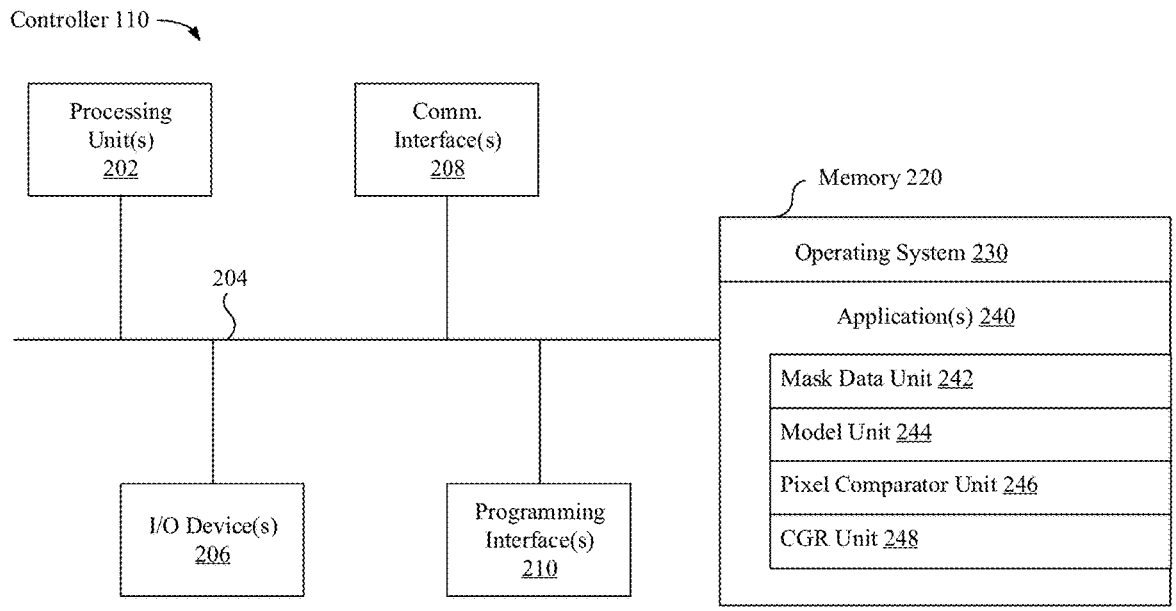
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the operating system 230 includes built in CGR functionality, for example, including a CGR environment application or viewer that is configured to be called from the one or more applications 240 to display a CGR environment within a user interface. In some implementations, the applications 240 are configured to manage and coordinate one or more experiences for one or more users (e.g., a single experience for one or more users, or multiple experiences for respective groups of one or more users).

The applications 240 include a mask data unit 242, a model unit 244, a pixel comparator unit 246, and a CGR unit 248. The mask data unit 242, the model unit 244, the pixel comparator unit 246, and the CGR unit 248 can be combined into a single application or unit or separated into one or more additional applications or units. The mask data unit 242 is configured with instructions executable by a processor to obtain the image data and generate mask data (e.g., an occlusion mask) using one or more of the techniques disclosed herein. The model unit 244 is configured with instructions executable by a processor to create a parameterized color model based on image data using one or more of the techniques disclosed herein. For example, the model unit 244 may identify parameters for a color model that describes the pixel colors correlation as a convolution with a Gaussian mixture kernel that produces output that is similar to the pixels of an image. The pixel comparator unit 246 is configured with instructions executable by a processor to perform pixel comparison handling (e.g., by comparing pixel values at each pixel location in a prior frame to pixel values at the same pixel locations for a new frame) using one or more of the techniques disclosed herein. The CGR unit 248 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
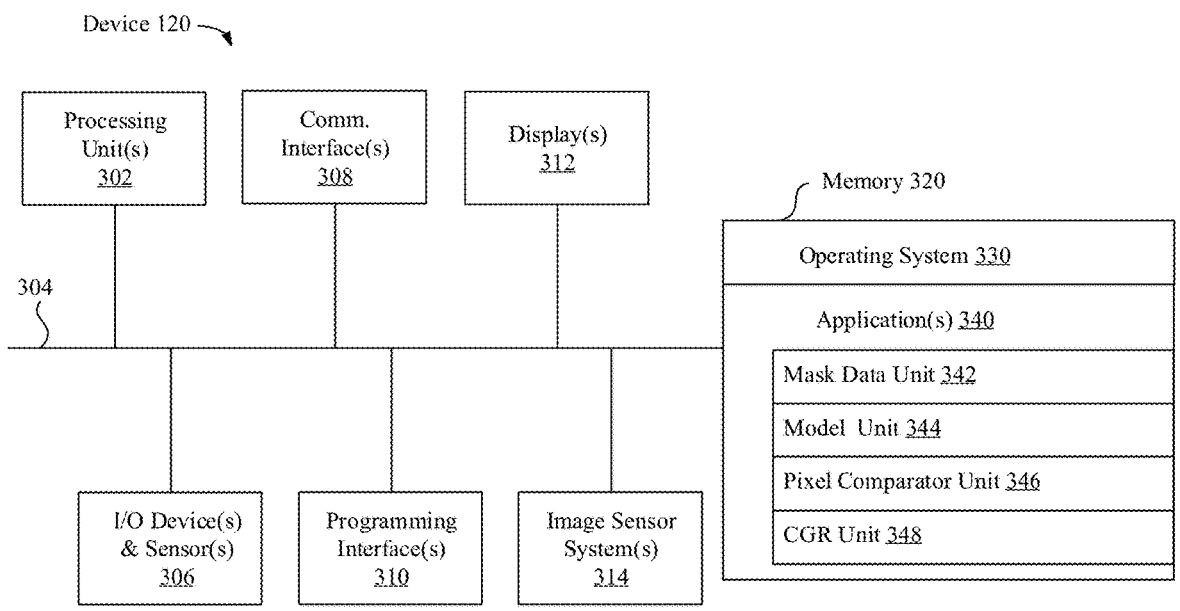
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the operating system 330 includes built in CGR functionality, for example, including an CGR environment application or viewer that is configured to be called from the one or more applications 340 to display a CGR environment within a user interface. In some implementations, the applications 340 are configured to manage and coordinate one or more experiences for one or more users (e.g., a single experience for one or more users, or multiple experiences for respective groups of one or more users).

The applications 340 include a mask data unit 342, a model unit 344, a pixel comparator unit 346, and a CGR unit 348. The mask data unit 342, the model unit 344, the pixel comparator unit 346, and the CGR unit 348 can be combined into a single application or unit or separated into one or more additional applications or units. The mask data unit 342 is configured with instructions executable by a processor to obtain the image data and generate mask data (e.g., an occlusion mask) using one or more of the techniques disclosed herein. The model unit 344 is configured with instructions executable by a processor to create a parameterized color model based on image data using one or more of the techniques disclosed herein. For example, the model unit 344 may identify parameters for a color model that describes the pixel colors correlation as a convolution with a Gaussian mixture kernel that produces output that is similar to the pixels of an image. The pixel comparator unit 346 is configured with instructions executable by a processor to perform pixel comparison handling (e.g., by comparing pixel values at each pixel location in a prior frame to pixel values at the same pixel locations for a new frame) using one or more of the techniques disclosed herein. The CGR unit 348 is configured with instructions executable by a processor to provide a CGR environment that includes depictions of a physical environment including real objects and virtual objects. The virtual objects may be positioned based on the detection, tracking, and representing of objects in 3D space relative to one another based on stored 3D models of the real objects and the virtual objects, for example, using one or more of the techniques disclosed herein.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Device 120 of FIG. 3 may be implemented as a head-mounted device (HMD) or other device that will present a view of the CGR environment. For example, a HMD may include internal sensors or be used with external sensors that track the HMDs current position and orientation in a 3D coordinate system over time. The tracking may involve computer vision, visual inertial odometry (VIO), simultaneous localization and mapping (SLAM), or any other appropriate technique. In some implementations, the viewpoint is associated with the actual pose of a real device. In some implementations, the viewpoint is associated with a virtual pose of a virtual camera.

Figure 4:
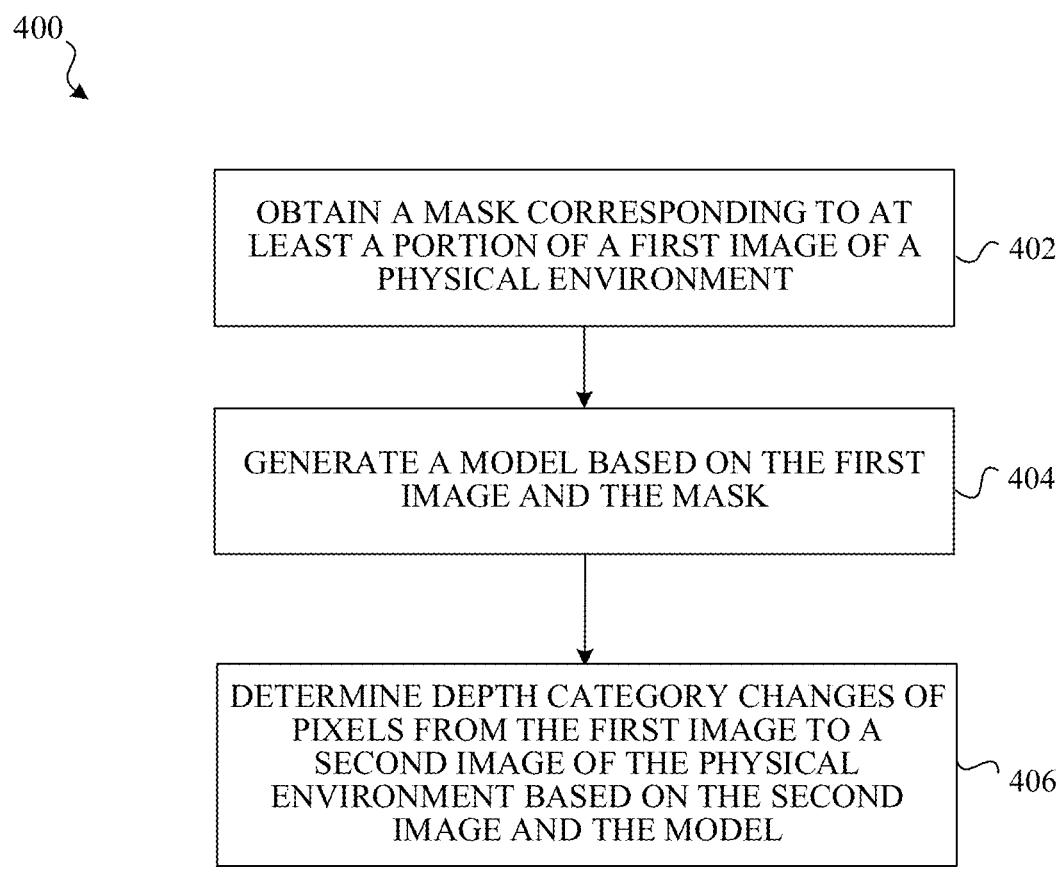
FIG. 4 is a flowchart representation of an exemplary method that determines depth category changes of pixels in accordance with some implementations.

FIG. 4 is a flowchart representation of an exemplary method 400 that determines depth category changes of pixels in accordance with some implementations. In some implementations, the method 400 is performed by a device (e.g., controller 110 of FIGS. 1 and 2), such as a mobile device, desktop, laptop, or server device. The method 400 can be performed on a device (e.g., device 120 of FIGS. 1 and 3) that has a screen for displaying 2D images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory).

The method 400 compares image data between a prior time frame and a subsequent time frame in order to compensate for the missing real depth data at the subsequent time. Depth data at the subsequent time (e.g., current time) may be missing because of mismatched frame rate speeds of light intensity and depth image frames. The additional depth data may be used for various purposes. In some implementations, depth data is used in compositing images of real and virtual content. During such image composition, the depth ordering of real and virtual objects may be taken in account in order to have a realistic and physically meaningful composition of a scene (e.g. a scene in which a wide-open hand is waving in front of a virtual object will have parts of the virtual objects visible through the fingers while the rest of the virtual object will be occluded by the hand). In such use cases, frame rate capture differences may result in missing depth data. Light intensity images of the real environment may be captured faster (e.g., at 120 FPS) than depth data captured of the real environment, for example, because a depth camera is typically slower at acquiring the respective depth image data, such as 40 FPS. In this example, the system would acquire two additional frames of data for the real light intensity data for each frame of the real depth data. Therefore, in this and other examples a light intensity camera may capture a first image and then a second image where there is corresponding depth data available for the first image and no corresponding depth data available for the second image.

At block 402, the method 400 obtains (e.g., receiving or generating) a mask corresponding to at least a portion of a first image of a physical environment, the first image comprising pixels each having a value provided by a camera (e.g., RGB cameras with a complimentary metal-oxide-semiconductor (CMOS) image sensor or a charge-coupled device (CCD) image sensor, monochrome cameras, IR cameras, event-based cameras, or the like). According to some implementations, the mask identifies pixels of the first image that are associated with a first depth category. For example, the mask may identify whether each particular pixel is foreground data or background data. According to some implementations, the mask may include a mask such as an occlusion mask, a foreground mask, a background mask, a mid-focus-range mask, or the like. Additionally, or alternatively, occlusion masks may be determined, for example, from color segmentation (e.g., the hands color), using real depth thresholding, using people detection, and/or using real depth data in additional sequence of images and virtual depth data in a sequence of images corresponding to virtual content.

At block 404, the method 400 generates a model (e.g., a Gaussian mixture model, polynomial representation, parameterized histogram, etc.) based on the first image and the mask. In one example, a model unit (e.g., model unit 244 of FIG. 2, or model unit 344 of FIG. 3) generates a model based on (e.g., representing) occurrences of pixels associated with the first depth category that have a characteristic (e.g., greyscale value 1) of a set of characteristics (e.g., greyscale values in the range 0-255). For example, the model may be a histogram representing how many foreground pixels of the first image have greyscale value 1, how many foreground pixels of the first image have greyscale value 2, etc. In another example, the model is a histogram representing how many pixels of the first image have texture 1, how many foreground pixels of the first image have texture 2, etc., where texture of a pixel is categorized into one of a discrete set of types based on the pixel and its surrounding pixels. In some implementations, other representations are based on a mixture of Gaussians.

Various techniques may be applied to acquire depth image data to assign each portion (e.g., pixel) of the image. Such techniques may involve obtaining and analyzing depth values, depth images, and depth histograms and may result in the creation of one or more masks that identify portions of the image associated with the different focal depth planes. In some implementations, depth data is obtained from sensors or 3D models of the content of an image. Some or all of the content of an image can be based on a real environment, for example, depicting the scene of the physical environment 105 around the device 120. Image sensors may capture images of the scene 105 for inclusion in the image and depth information about the scene of the physical environment 105 may be determined. In some implementations, a depth sensor on the device 120 determines depth values for pixels of images captured by an image sensor on the device 120. The scene of the physical environment 105 around the user may be 3D modeled based on one or more values and subsequent depths of objects depicted in subsequent images of the scene can be determined based on the model and camera position information. In some implementations, virtual objects may be presented with the image data in a CGR environment, and the virtual objects may have pre-assigned depth values or coordinates from which such depth values can be determined. In some implementations, depth data (e.g., associated with content of a scene or model) is directly analyzed to separate the image portions (e.g., pixels) into foreground and background. For example, a predetermined threshold or thresholds may be used to make such separations.

In some implementations, the method 400 further involves classification-based machine learning to generate the model. In particular, the method 400 may further include generating the model based on the first image and the mask by identifying the occurrences of pixels associated with the first depth category that have a characteristic of the set of characteristics and the relationships between the pixels using a machine learning model that uses a representation of the first image and the mask as input. Machine learning can involve classification algorithms and/or regression algorithms. Examples of machine learning models include, but are not limited to, classification models, regression models, decision trees, support vector machines, or Bayesian networks. In some implementations, a machine learning model inputs an image and a mask and outputs for each characteristic of a set of characteristics (e.g., each color range of the potential color value ranges), a probability of a pixel having that characteristic having a particular depth category (e.g., foreground or background). The input to such a model may include one or more images captured in the physical environment, e.g., the most recent 5 frame and masks corresponding to each such frame.

At block 406, the method 400 determines depth category changes of pixels from the first image to a second image of the physical environment based the second image and the model. For example, determining depth category changes may include a pixel comparator unit (e.g., pixel comparator unit 246 of FIG. 2, or pixel comparator unit 346 of FIG. 3) determining that a pixel has changed from foreground image data (e.g., a hand waving) to background image data (e.g., an object in the background, such as a mountain) or vice versa.

According to some implementations, the plurality of pixels of the first image are spatially correlated and are aligned with the plurality of pixels of the second image. Additionally, the second image subsequently follows the first image in a sequence of image frames. For example, pixel locations are aligned and correlated between each subsequent image frame, where each individual pixel location that the image is displayed upon in a first image at an initial frame (e.g., at time $t_0$) is compared to the corresponding pixels that the image is displayed in a subsequent frame (e.g., at time $t_1$), as shown in FIGS. 10A-10B, further described herein.

In one implementation, as further described below for method 500, determining depth category changes may include using the model to determine a first probability that a pixel of the first image at a pixel location is associated with the first depth category based on which characteristic the pixel exhibits in the first image (e.g., based on the pixel having greyscale color 1, the model provides a 75% chance the pixel is foreground in the first image). Additionally, determining depth category changes may include using the model to determine a second probability that a pixel in the second image at the pixel location is associated with the first depth category based on which characteristic the pixel exhibits in the second image (e.g., based on the pixel having greyscale color 87, the model provides a 10% chance that the pixel is foreground in the second image). Determining depth category changes may further include determining a depth category change by comparing the first probability to the second probability. For example, comparing 75% probability of one particular pixel location in a first image to 10% probability of the same particular pixel location in a second image indicates that the pixel has changed from foreground image data to background image data. In some example implementations, multiple depth categories are assessed, and probabilities are determined for each pixel for each category.

In another implementation, as further described below for method 600, determining depth category changes are based on whether a change in pixel intensity value exceeds a pixel intensity threshold for each pixel location. For example, if pixel intensity has changed for a particular pixel location (e.g., from 38% to 5%=−33%) more than a threshold (e.g., >30%), it would be determined that a depth category has changed (e.g., from foreground to background or vice versa).

Figure 5:
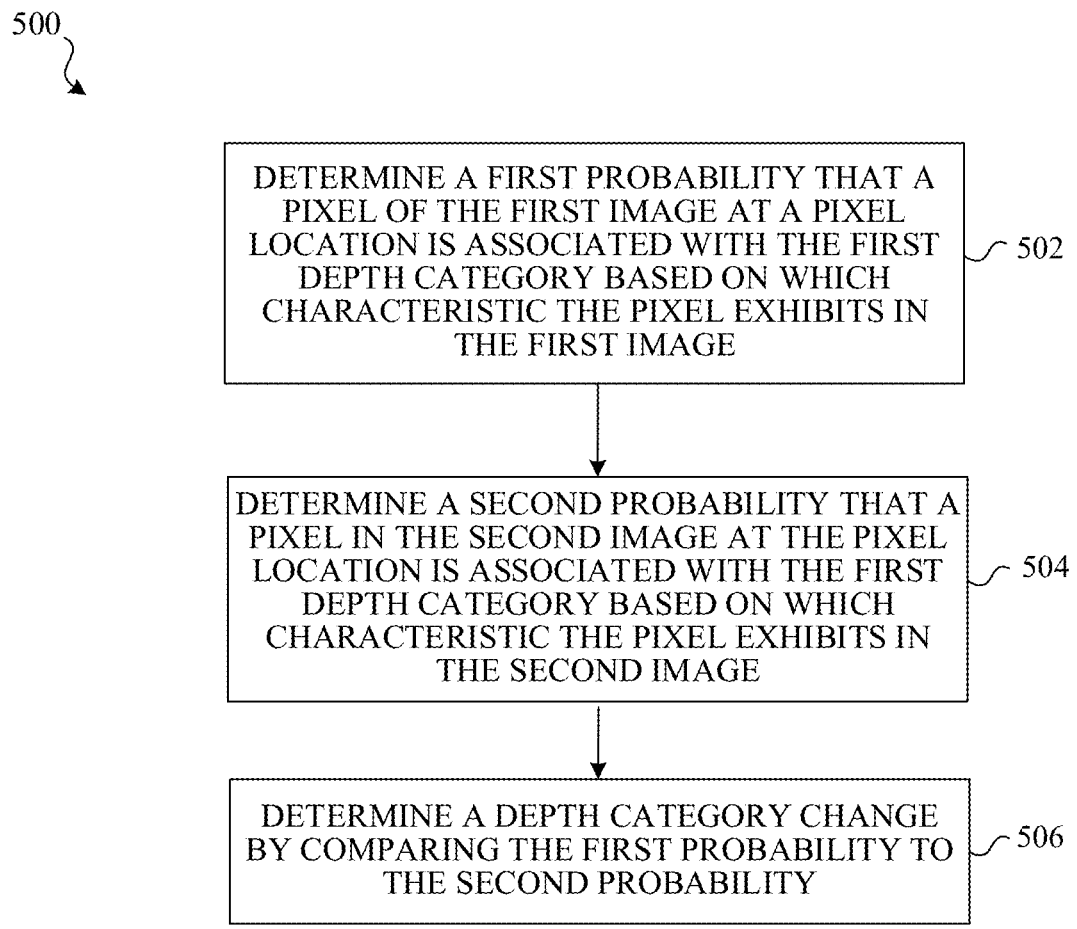
FIG. 5 is a flowchart representation of an exemplary method that determines depth category changes of pixels based on probabilities of depth categories in accordance with some implementations.

FIG. 5 is a flowchart representation of an exemplary method 500 that determines depth category changes of pixels based on probabilities of depth categories. In some implementations, the method 500 is performed by a device (e.g., controller 110 of FIGS. 1 and 2), such as a mobile device, desktop, laptop, or server device. The method 500 can be performed on a device (e.g., device 120 of FIGS. 1 and 3) that has a screen for displaying 2D images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory).

At block 502, the method 500 determines a first probability that a pixel of the first image at a pixel location is associated with the first depth category based on which characteristic the pixel exhibits in the first image. For example, based on a particular pixel having greyscale color 1, a model unit (e.g., model unit 244 of FIG. 2, or model unit 344 of FIG. 3) determines a 15% chance the pixel location is showing a foreground object in the first image. FIG. 10A illustrates the outline of the hand 1010 such that the pixel 922a does not display a darker area within that pixel, thus does not include a grey shaded area, but neighboring pixels 1002d, 1002f, 1002g, and 1002h display a grey shaded area for positively including the foreground object (hand 1010) in the pixel. Additionally, a probability of each pixel indicating a category (e.g., a foreground object, a background object, or the like) is also shown for each pixel. For example, in the initial image, the hand 1010 is shown in the bottom left of the pixel grid 920a (pixels 1002d, 1002f, 1002g, and 1002h), and pixel 922a shows a 15% probability that the pixel 922a indicates a particular category (e.g., a foreground object).

At block 504, the method 500 determines a second probability that a pixel in the second image at the pixel location is associated with the first depth category based on which characteristic the pixel exhibits in the second image. For example, based on the pixel having greyscale color 87, the model provides a 75% chance that the pixel is foreground in the second image. FIG. 10B illustrates the hand 1010 has moved to the right, such that the pixel 922b (corresponding to the pixel 922a having the same pixel location) and neighboring pixels 1004d, 1004g, and 1004h would be marked as including the foreground object (e.g., hand 1010). Thus, as the hand 710 moved to the right in the image in front of the background object 720 in FIGS. 7A-7C, a portion of the foreground object is detected as moving from one pixel location to a subsequent pixel location. For example, as the hand 1010 has moved to the right, pixel 922b now shows a 75% probability that the pixel 922b corresponds to a foreground object. This data is used to compensate for lags between masks (and possibly latency) to continuously adapt the current mask to the camera content, until the next detected mask is generated or obtained, as described herein.

At block 506, the method 500 determines a depth category change by comparing the first probability to the second probability. For example, a pixel comparator unit (e.g., pixel comparator unit 246 of FIG. 2, or pixel comparator unit 346 of FIG. 3) can analyze each pixel location to compare whether a change between the first probability to the second probability indicates a change from foreground to background or vice versa. For example, comparing 15% probability of one particular pixel location in a first image to 75% probability of the same particular pixel location in a second image indicates that the pixel has changed from background to foreground, or vice versa depending on the model. In some example implementations, multiple depth categories are assessed, and probabilities are determined for each pixel for each category. Thus, the image data is analyzed by comparing pixels of a current frame (e.g., at time $t_1$) with pixels of a prior frame (e.g., at time $t_0$) to estimate a depth category change for a particular pixel location. In some implementations, determining depth category changes of pixels from the first image to the second image involves pixel intensity values, and is described below with respect to method 600 of FIG. 6.

Figure 6:
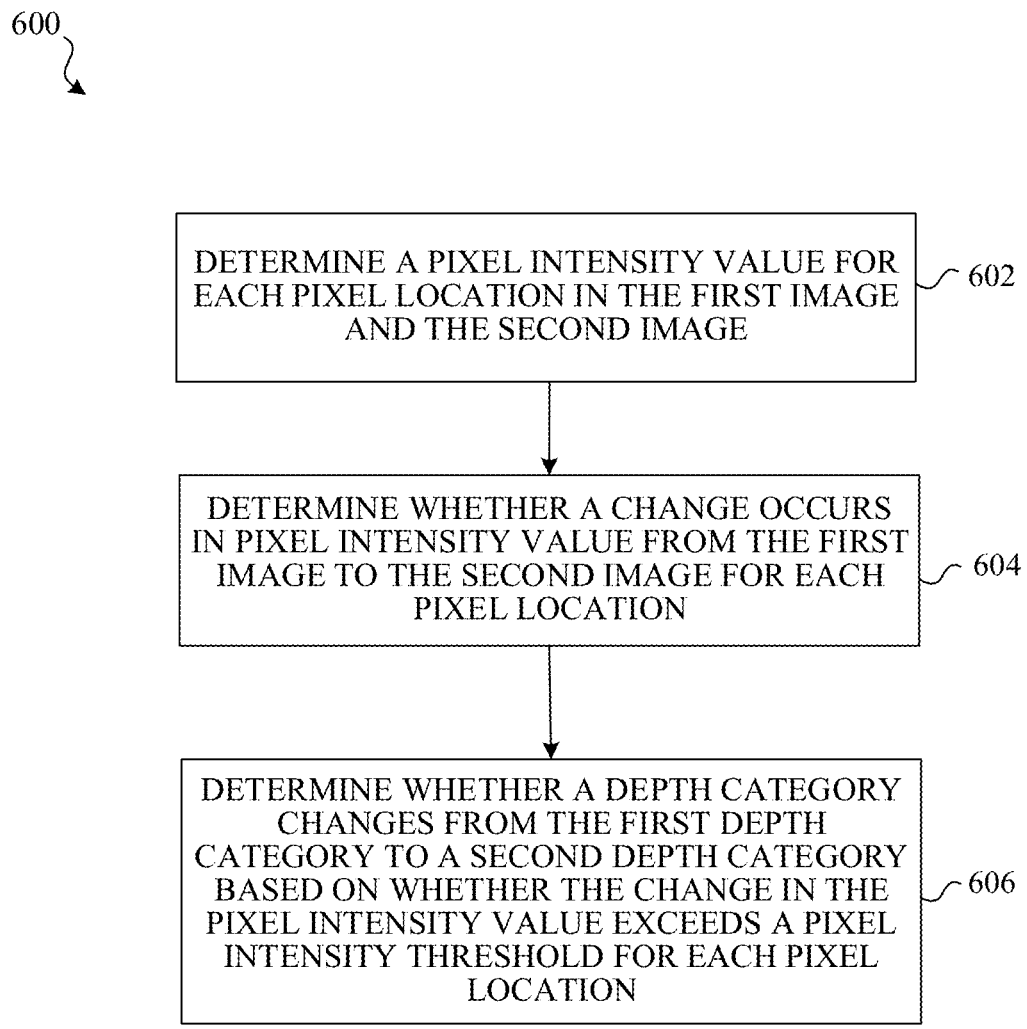
FIG. 6 is a flowchart representation of an exemplary method that determines depth category changes of pixels based on pixel intensity values in accordance with some implementations.

FIG. 6 is a flowchart representation of an exemplary method 600 that determines depth category changes of pixels based on pixel intensity values in comparison to an intensity threshold. In some implementations, the method 600 is performed by a device (e.g., controller 110 of FIGS. 1 and 2), such as a mobile device, desktop, laptop, or server device. The method 600 can be performed on a device (e.g., device 120 of FIGS. 1 and 3) that has a screen for displaying 2D images and/or a screen for viewing stereoscopic images such as a head-mounted display (HMD). In some implementations, the method 600 is performed by processing logic, including hardware, firmware, software, or a combination thereof. In some implementations, the method 600 is performed by a processor executing code stored in a non-transitory computer-readable medium (e.g., a memory).

At block 602, the method 600 determines a pixel intensity value for each pixel location in the first image and the second image. For example, the system generates an initial pixel intensity value frame (e.g., $PIV_0$) at the initial time $t_0$ and generates a subsequent pixel intensity value frame (e.g., $PIV_1$) at the subsequent time $t_1$. A pixel comparator unit (e.g., pixel comparator unit 246 of FIG. 2, or pixel comparator unit 346 of FIG. 3), or similar module, can analyze each pixel location in the first image and the second image to determine a pixel intensity value for each pixel location.

At block 604, the method 600 determines whether a change occurs in pixel intensity value from the first image to the second image for each pixel location. A pixel comparator unit (e.g., pixel comparator unit 246 of FIG. 2, or pixel comparator unit 346 of FIG. 3) can determine, for each pixel location, whether the pixel intensity value has changed between the first and second images (e.g., an initial pixel intensity value frame $PIV_0$ at the initial time $t_0$ and a subsequent pixel intensity value frame $PIV_1$ at the subsequent time $t_1$). For example, the pixel comparator unit can determine pixel intensity for a pixel location for a first image frame $PIV_0$ at 38% and determine pixel intensity for the same pixel location for a second image frame $PIV_1$ at 5%.

At block 606, the method 600 determines whether a depth category changes from the first depth category to a second depth category based on whether the change in the pixel intensity value exceeds a pixel intensity threshold for each pixel location. For example, a pixel comparator unit (e.g., pixel comparator unit 246 of FIG. 2, or pixel comparator unit 346 of FIG. 3) can analyze each pixel location to compare whether a change in pixel intensity value exceeds a pixel intensity threshold. For example, if the pixel intensity changes from $PIV_0$ at 38% to $PIV_1$ at 5% for a particular pixel location, the image intensity differential (e.g., $[PIV_1 - PIV_0]$) would be −33%. Where if the pixel intensity changes more than a threshold (e.g., >30%), a depth category for that particular pixel location would be determined to have changed (e.g., the pixel location is determined to have changed from a background pixel to a foreground pixel, or vice versa).

Figure 7A:
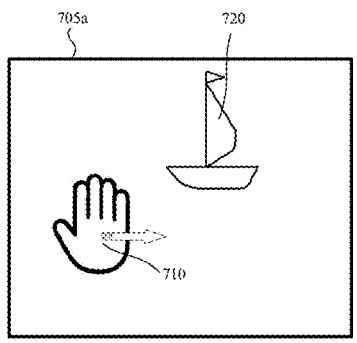
FIGS. 7A-7C are block diagrams illustrating an example occlusion event between two objects in accordance with some implementations.
Figure 7B:
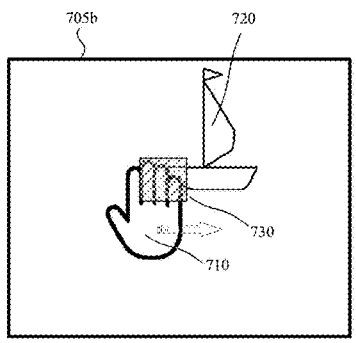
Figure 7C:
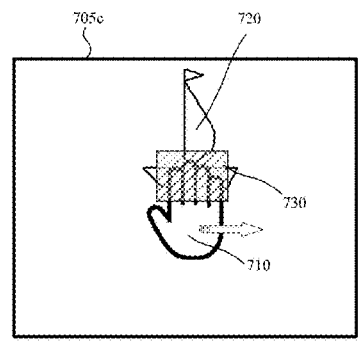

As will be illustrated in FIGS. 7A-7C, depictions of objects (e.g., physical objects and/or virtual objects) can be combined with real objects of the physical environment from the images captured of the environment 105. In particular, FIG. 7A illustrates an image 705a that includes a background object 720 (e.g., a boat in the background of the image) and the hand 710 without an occlusion occurring between the two objects (e.g., the hand 710 is not blocking the background object 720 in this particular viewpoint). FIG. 7B illustrates an image 705b environment that includes a background object 720 and the hand 710 that has partially occluded a portion of the background object 720 at the occlusion boundary region 730 as the hand has started waving in front of the background object 720. FIG. 7C illustrates an image 705c that includes a background object 720 and the hand 710 that has occluded a larger portion of the background object 720 at the occlusion boundary region 730 as the hand has continue waving in front of the background object 720. In various implementations, using an accessible virtual object, such as a virtual cube, and selectable operator actions, the virtual cube can be added to a CGR environment that includes real objects, such as the hand 710. In some implementations, background object 720 is a virtual object, and the occlusion boundary region 730 indicates an occlusion between the hand 710, and a virtual background object, such as background object 720

FIGS. 7B and 7C illustrate an occlusion boundary region 730 (also referred to herein as mask data or an occlusion mask) that is used to detect occlusion and revealed pixels by means of color models built from foreground areas and from the probabilities of a pixel belonging to the foreground area with respect to the hand 710 and a background object 720, in accordance with some implementations described herein. In various implementations, an occlusion boundary region 730 is an occlusion boundary between detected objects (e.g., hand 710 and background object 720) in a physical environment or between a physical object and a virtual object in a CGR environment. In some implementations, the occlusion boundary region 730 is based on where and how the foreground object (e.g., hand 710) and the background object (e.g., background object 720) overlap in a physical environment. In some implementations, the occlusion boundary region 730 is based on where and how the detected real objects and the virtual objects overlap in a CGR environment. Creating a mask may include techniques that involve obtaining and analyzing depth information and may result in the creation of one or more masks that identify portions of the image associated with the different focal depth planes. In some implementations, masks can be extracted from image data by a mask data unit (e.g., mask data unit 242 of FIG. 2, or mask data unit 342 of FIG. 3). Additionally, or alternatively, masks and can be computed by a detector being very specialized in certain class(es) of object(s) and, as such, computationally slow, where the low speed may stem from limited hardware and/or complex detector architecture. Detection time may be also reduced by moving the detector on a specialized external hardware and latency may be introduced due to transmission time between the components. In some implementations, masks can be extracted from a device's world-facing depth camera and can be computed by thresholding the depth image (e.g. all the data within 0.5 m is taken in account).

In some implementations, the occlusion boundary region 730 can be a preset or variable size or a preset or variable number of pixels (e.g., a few pixels or tens of pixels) based on the display device characteristics, size of the detected real objects and the virtual objects, motion of the detected real objects and the virtual objects or the like. In some implementations, the occlusion boundary region 730 is resolved before generating or displaying the CGR environment. In some implementations, the occlusion boundary region 730 is resolved on a frame-by-frame process. In some implementations, the occlusion boundary region 730 is resolved by an occlusion boundary region correction process. In some implementations, an algorithm processes criteria that precisely determines whether each pixel in the occlusion boundary region is to be corrected based on determining whether the pixel should be part of the virtual object or the detected real object and is occluded or visible. In some implementations, the occlusion boundary region is corrected at full image resolution. In some implementations, the occlusion boundary region is corrected at least in part using a reduced image resolution.

In some implementations, the occlusion boundary region 730 may be distorted or blurry with respect to the background object 720 when the hand 710 is waving in front of the background object 720 and is caused at least in part by a lower frame rate for the depth camera image sequence. For example, depth cameras may not have as a high frame rate as the color counterpart cameras and may produce images not in sync with companion color cameras. For example, the light intensity camera image sequence (e.g., RGB camera) may be received at 120 fps, while the depth camera may only be acquiring depth images at 40 fps. Thus, in a CGR environment, there may be some lag in the virtual object and physical objects during a quick movement of a physical object in front of a virtual object creating an occlusion event.

Figure 8:
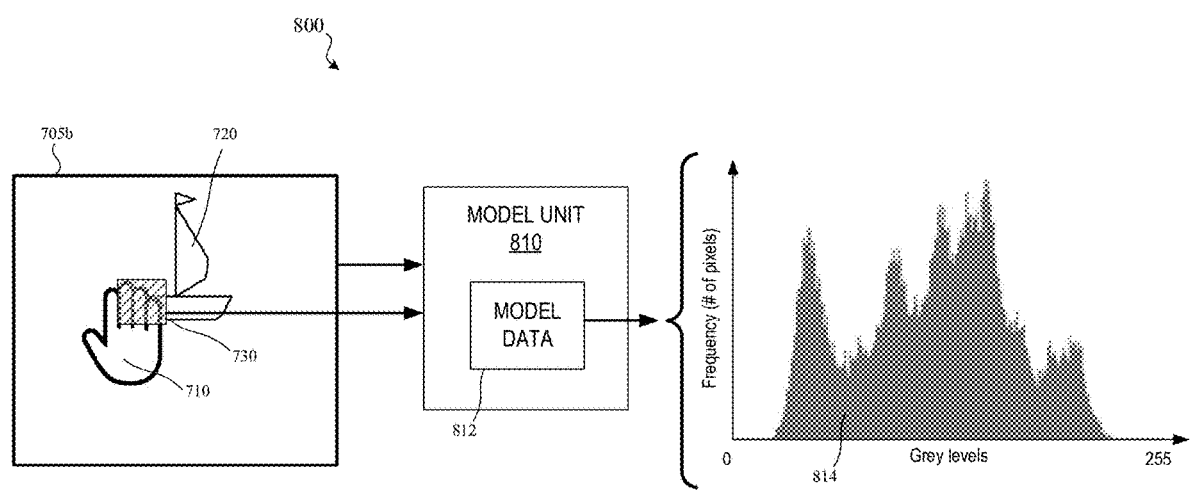
FIG. 8 is a block diagram illustrating an example model data extracted from an occlusion boundary region in accordance with some implementations.

FIG. 8 is a block diagram 800 illustrating an example model data extracted from mask data (e.g., an occlusion boundary region). In particular, model unit 810 (e.g., model unit 244 of FIG. 2, or model unit 344 of FIG. 3) receives composite image data (e.g., image 705b in FIG. 7C where the hand 710 is partially occluding the background object 720) and mask data, and generates model data 812 for the pixels in the image belonging to the masked area (e.g., occlusion boundary region 730). In some implementations, the mask data may be received from a mask data unit (e.g., mask data unit 242 of FIG. 2, or mask data unit 342 of FIG. 3). In some implementations, model unit 810 generates model data 812 for the entire composite image (e.g., image 705b), and not only for the mask data of the occlusion area (e.g., occlusion boundary region 730).

In the example implementation shown in FIG. 8, the model data 812 generated may be for grey levels and/or grey values to generate a grey level histogram 814. The minimum grey level is 0, and the maximum grey level depends on the digitization depth of the image. For an 8-bit-deep image, the maximum grey level is 255. In a binary image, a pixel can take on either the value 0 or the value 255. In contrast, in a greyscale or color image (e.g., image 705b), a pixel can take on any value between 0 and 255. Thus, in a color image the grey level of each pixel can be calculated using the following formula: grey level=(0.299*red component)+(0.587*green component)+(0.114*blue component), which takes into account the color sensitivity of the human eye making the presentation of the grey levels independent of color and limited solely to the brightness of the individual pixels. The grey level histogram 814 indicates how many pixels of an image share the same grey level, where the x-axis shows the grey levels (e.g., from 0 to 255), and the y-axis shows their frequency in the image of intensity values (e.g., 0-255). In some implementations, an intensity histogram may be used. Alternatively, in some implementations, converting RGB images to gray levels may utilize other methods (e.g., a lightness method that averages the most prominent and least prominent colors, an average method that averages the RGB values, a luminosity method that utilizes weighted averages to account for human perception, or the like).

In some implementations, a color model or color histogram for image data of three-dimensional spaces (e.g., RGB, HSV, etc.) may be generated by the model unit 810. For example, a color histogram represents the number of pixels that have colors in each of a fixed list of color ranges, that span the image's color space, the set of all possible colors. If the set of possible color values is sufficiently small, each of those colors may be placed on a range by itself, then the color histogram is the count of pixels that have each possible color. In some implementations, the space may be divided into an appropriate number of ranges, often arranged as a regular grid, each containing many similar color values. For example, assume that the color values for R, G, and B each range from 0-100, a first example bin of a color histogram may include R: 0-10, G: 0-10, and B: 0-10, a second example bin may include R: 11-20, G: 0-10, and B: 0-10, a third bin may include R: 11-20, G: 11-20, and B: 0-10, and so forth, until every possible range of RGB color values is accounted for. In some implementations, the color histogram may also be represented and displayed as a smooth function defined over the color space that approximates the pixel counts.

FIGS. 9A and 9B illustrate block diagrams of an example image at an occlusion boundary region. For example, the grid 905 may be of the occlusion boundary region 730 of the images 705b and 705c in FIGS. 7B and 7C, respectively, where the hand 710 is partially occluding the background object 720. FIG. 9A illustrates a foreground object 910 (e.g., the hand 710) that is moving to the right at a particular first frame (e.g., frame $X_0$ at time $t_0$) as it begins to occlude a background object 720 (e.g., FIG. 7B). FIG. 9B illustrates the foreground object 910 in a subsequent light intensity image frame (e.g., frame $X_1$ at time $t_1$) after it has moved to the right and further occludes the background object 720 (e.g., FIG. 7C). Each pixel of the grid 905 for the occlusion mask data (e.g., occlusion boundary region 730) may be evaluated for the foreground object 910. The pixel 922a in the pixel region 920a in FIG. 9A, and the pixel 922b in the pixel region 920b in FIG. 9B, which are at the same respective pixel location, are shown in more detail in FIGS. 10A and 10B, respectively.

FIGS. 10A and 10B illustrate block diagrams of pixel grids and pixel category probability calculations of an example occlusion image at an occlusion boundary region at a particular image frame and a subsequent image frame, respectively. In particular, FIG. 10A illustrates an outline of the hand 1010 (e.g., an outline rendering of the hand 910 of FIG. 9A) within the pixel region 920a of FIG. 9A at a particular first frame (e.g., frame $X_0$ at time $t_0$), including the pixel 922a, and neighboring pixels 1002a-1002h. Similarly, FIG. 10B illustrates the outline of the hand 1010 within the pixel region 920b of FIG. 9B at a subsequent light intensity image frame (e.g., frame $X_1$ at time $t_1$) after the hand has moved to the right, including the pixel 922b and neighboring pixels 1004a-1004h (which correspond to the same pixel locations as pixel 922a and neighboring pixels 1002a-1002h of FIG. 9A). In the example implementation, an outline of the hand 1010 is shown for illustrative purposes in FIGS. 10A and 10B. Alternatively, the outline of the hand 1010 is generated as a contour image of the hand 910, and the contour image is analyzed at each pixel location according to the processes described herein.

FIG. 10A illustrates the outline of the hand 1010 such that the pixel 922a does not display a darker area within that pixel, thus does not include a grey shaded area, but neighboring pixels 1002d, 1002f, 1002g, and 1002h display a grey shaded area for positively including the foreground object (hand 1010) in the pixel. Additionally, a probability of each pixel indicating a category (e.g., a foreground object, a background object, or the like) is also shown for each pixel. For example, in the initial image, the hand 1010 is shown in the bottom left of the pixel grid 920a (pixels 1002d, 1002f, 1002g, and 1002h), and pixel 922a shows a 15% probability that the pixel 922a indicates a particular category (e.g., a foreground object). In a subsequent image frame, FIG. 10B illustrates the hand 1010 has moved to the right, such that the pixel 922b (corresponding to the pixel 922a having the same pixel location) and neighboring pixels 1004d, 1004g, and 1004h would be marked as including the foreground object (e.g., hand 1010). Thus, as the hand 710 moved to the right in the image in front of the background object 720 in FIGS. 7A-7O, a portion of the foreground object is detected as moving from one pixel location to a subsequent pixel location. Additionally, a probability of each pixel indicating a category (e.g., a foreground object, a background object, or the like) is also shown for each pixel. For example, as the hand 1010 has moved to the right, pixel 922b now shows a 75% probability the pixel 922b indicates a foreground object. This data is used to compensate for lags between masks (and possibly latency) to continuously adapt the current mask to the camera content, until the next detected mask is generated or obtained, as described herein.

Figure 11:
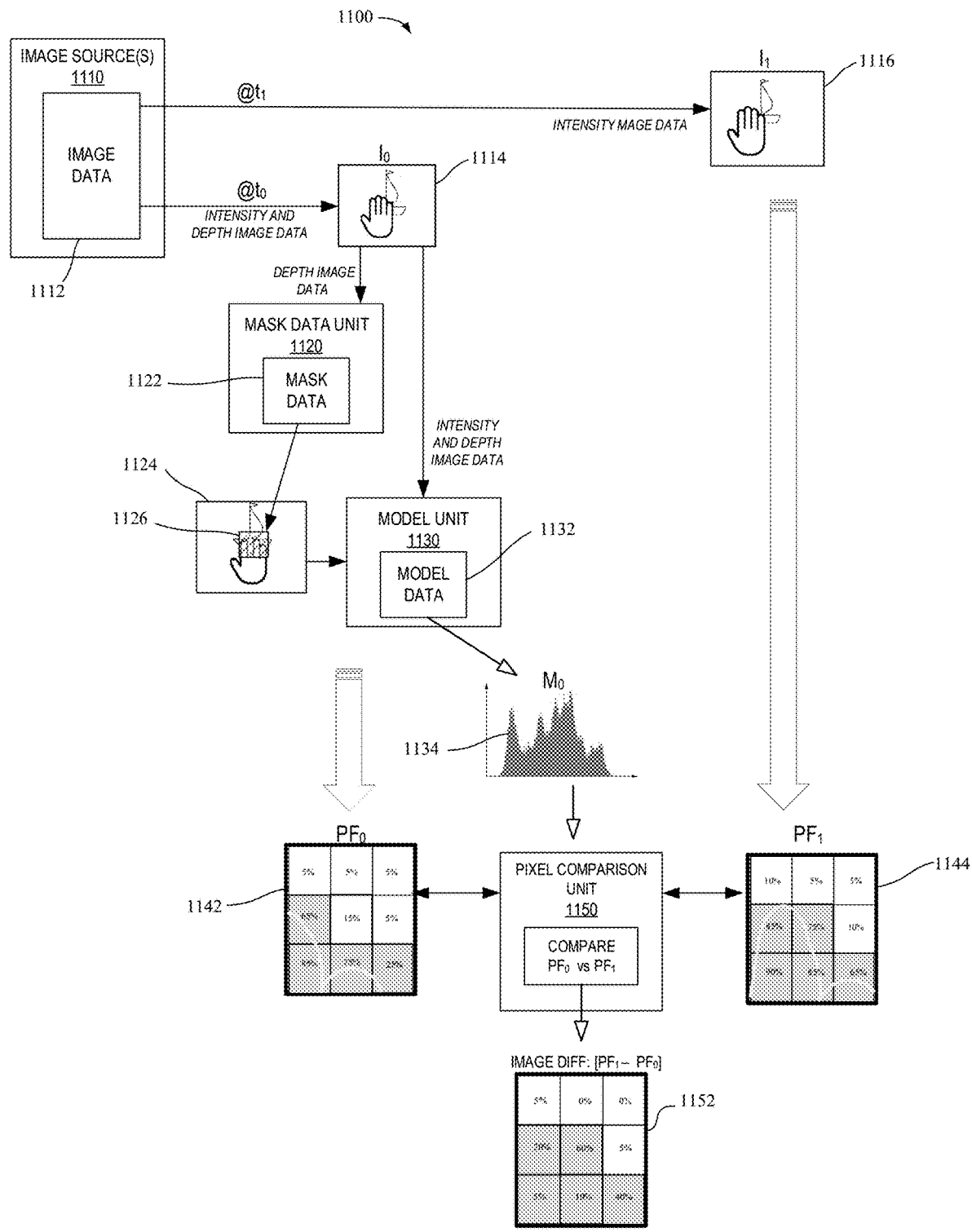
FIG. 11 is a system flow diagram of an example determination of depth category changes of pixels according to certain implementations.

The examples of FIGS. 7-10 illustrate various implementations of occlusion handling for a moving foreground object (e.g., a hand) as it occludes a background object (e.g., a physical object or a virtual object in a CGR environment). The efficient and accurate determination of occlusion using techniques disclosed herein can enable or enhance CGR environments by compensating for lags between masks (and possibly latency) to continuously adapt a current mask to the camera content, until the next detected mask is obtained or generated (e.g., by a mask data unit). FIG. 11 illustrates an example block diagram for an example environment to determine pixel category changes for a subsequent image frame based on mask data and model data from a prior image frame.

FIG. 11 is a system flow diagram of an example environment 1100 in which a system can determine depth category changes of pixels at an occlusion boundary region based on received image data (e.g., physical content and/or virtual content) from a composition pipeline for a current time (e.g., time $t_1$) from an initial time for a prior image frame (e.g., time $t_0$). In some implementations, the system flow of the example environment 1100 is performed on a device (e.g., controller 110 of FIGS. 1 and 2), such as a mobile device, desktop, laptop, or server device. The system flow of the example environment 1100 can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1100 is performed on processing logic, including hardware, firmware, software, or a combination thereof. In some implementations, the system flow of the example environment 1100 is performed on a processor executing code stored in a non-transitory computer-readable medium (e.g., a memory).

The example environment 1100 compares image data between a prior time frame (e.g., initial image frame $I_0$ 1114 at initial time $t_0$) and a current time frame (e.g., subsequent image frame $I_1$ 1116 at subsequent time $t_1$) in order to compensate for the missing real depth data at subsequent time $t_1$ because of the mismatched frame rate speeds. During the image composition, the depth ordering of real and virtual objects should be taken in account in order to have a realistic and physically meaningful composition of the scene (e.g. a scene in which a wide-open hand is waving in front of a virtual object will have parts of the virtual objects visible through the fingers while the rest of the virtual object will be occluded by the hand). Recall, for example, the frame rates for the virtual content data (e.g., virtual depth data and virtual intensity data) matches the light intensity camera frame rates, such as 120 FPS, for example. However, because a depth camera is typically slower at acquiring the respective depth image data, such as 40 FPS, the system would acquire two additional frames of data for the virtual content and real intensity data for each frame of the real depth data. Therefore, for the example environment 1100, subsequent time $t_1$ represents a subsequent image data frame from the light intensity camera frame rate where the real depth data, and thus an updated occlusion mask data at time $t_1$, is not available.

In the example implementation, the environment 1100 includes an image composition pipeline that acquires or obtains data (e.g., image data 1112 from image source(s) 1110) for a physical environment (e.g., physical environment 105 of FIG. 1). Example environment 1100 is an example of acquiring image data (e.g., light intensity data and depth data) at an initial image frame $I_0$ 1114 at time $t_0$, and acquiring image data (e.g., light intensity data) at a subsequent image frame $I_1$ 1116 at time $t_1$. The image source(s) 1110 may include a depth camera that acquires real depth data of the physical environment, and a light intensity camera (e.g., RGB camera) that acquires real intensity data. Additionally, or alternatively, in some implementations, the image composition pipeline (e.g., image data 1112) includes virtual content (e.g., a virtual boat as a background object, such as background object 720 of FIG. 7) that is generated for a CGR environment, as described herein. For example, the image composition pipeline may include a CGR unit (e.g., CGR unit 248 of FIG. 2, and CGR unit 348 of FIG. 3) that is configured with instructions executable by a processor to provide a CGR environment that includes depictions of a physical environment including real physical objects and virtual content. The CGR unit can generate virtual depth data (e.g., depth images of virtual content) and virtual intensity data (e.g., light intensity images (e.g., RGB) of the virtual content).

In some implementations, at the initial time $t_0$, the mask data unit 1140 (e.g., mask data unit 242 of FIG. 2, and mask data unit 342 of FIG. 3) obtains or receives the image frame $I_0$ 1114 (which includes light intensity image data and depth image data) and generates mask data 1122 (e.g., an occlusion mask) based on the depth data. The generated masked data includes the initial masked image frame 1124 (e.g., the hand 710 initially waving in front of the background object 720 as shown in FIG. 7B) that includes an occlusion boundary region 1126 (e.g., the occlusion boundary region 730 as shown in FIGS. 7B-7C). Additionally, at the initial time $t_0$, the model unit 1130 (e.g., model unit 244 of FIG. 2, and model unit 344 of FIG. 3) obtains the initial masked image frame 1124 with the initial image frame $I_0$ 1114 to generate model data 1132. The generated model data 1132 includes the initial model $M_0$ 1134 (e.g., histogram 814 in FIG. 8) at time $t_0$.

The system (e.g., the pixel comparator unit 1150 or another module), based on the initial model $M_0$ 1134 and the image frame $I_0$ 1114, generates an initial probability model frame $PF_0$ 1142 at the initial time $t_0$. For example, at the initial time $t_0$, the initial probability model frame $PF_0$ 1142 indicates the probability for each pixel of whether the pixel is displaying a foreground object (e.g., a hand) or a background object (e.g., a boat, or a virtual object in a CGR environment) during an occlusion event (e.g., hand waving in front of a background object). For example, at the initial time $t_0$, a pixel location (e.g., pixel 922a in FIGS. 9A and 10A) had a greyscale color value of 15, and the model provides a 15% chance the pixel location is foreground (e.g., a foreground object such as a hand) in the first image frame.

The system (e.g., the pixel comparator unit 1150 or another module) utilizes the initial model $M_0$ 1134 and image frame $I_0$ 1116 and generates a subsequent probability model frame $PF_1$ 1144 at the initial time $t_1$. The subsequent probability model frame $PF_1$ 1144 indicates the probability for each pixel of whether the pixel is displaying a foreground object (e.g., a hand) or a background object (e.g., a boat, or a virtual cube in a CGR environment) during an occlusion event (e.g., hand waving in front of a background object) at a subsequent image frame $t_1$, (e.g., when there is not depth data and thus no mask data available at time $t_1$, as discussed herein). For example, at the subsequent time $t_1$, the pixel location (e.g., pixel 922b in FIGS. 9B and 10B) had a greyscale color value of 80, and the model provides a 75% chance the pixel location is the foreground object in the second image frame.

The example environment 1100 further includes a pixel comparator unit 1150 (e.g., pixel comparator unit 246 of FIG. 2, and/or pixel comparator unit 346 of FIG. 3) that is configured with instructions executable by a processor to perform pixel comparison handling (e.g., by comparing pixel values at each pixel location in a prior frame to pixel values at the same pixel locations for a new frame) using one or more of the techniques disclosed herein. For example, as described above with respect to FIGS. 9A-9B and 10A-10B, the pixel comparator unit 1150 evaluates each pixel's determined category probability in the occlusion boundary area for the received images (e.g., initial probability model frame $PF_0$ and subsequent probability model frame $PF_1$). Thus, as FIG. 10B illustrates, the outline of the hand 1010 has moved to the right, such that the pixel 922b (corresponding to the pixel 922a having the same pixel location) and neighboring pixels 1004d, 1004g, and 1004h are marked with respective probabilities that each pixel is showing the foreground object. Thus, as the hand 710 moved to the right in the image in front of the background object 720 in FIG. 7C, the pixel 922b indicates a 75% probability that the pixel includes the foreground object.

The pixel comparison unit 1150 compares $PF_0$ to $PF_1$ to determine pixel category changes based on whether the change (e.g., the image differential 1152: $[PF_1-PF_0]$) for the pixel probability values indicates a change in a category for each pixel location. For example, continuing the example above, if the pixel probability from $PF_0$ at 15% (e.g., pixel 922a in FIG. 10A) that the pixel location is a foreground object to $PF_1$ at 75% (e.g., pixel 922b in FIG. 10B) for a particular pixel location (e.g., pixel 922a and pixel 922b correspond to the same pixel location), the pixel probability differential $[PF_1-PF_0]$ would be 60%, and the pixel comparison unit 1150 indicates that at the subsequent image frame, a depth category for that particular pixel location would be determined to have changed (e.g., the pixel location is determined to have changed from a background pixel to a foreground pixel, or vice versa). In one implementation, if the pixel probability is less than 50% for a pixel location for a first frame (e.g., 15%), and greater than 50% for the same pixel location for a subsequent frame (e.g., 75%), a depth category for that particular pixel location would be determined to have changed. In another implementation, if the pixel probability differential (e.g., $[PF_1-PF_0]$ is 60%) is more than a threshold (e.g., >50%) for a pixel location, a depth category for that particular pixel location would be determined to have changed.

Alternatively, the system (e.g., the pixel comparator unit 1150 or another module) determines changes for depth categories based on changes in pixel intensity values for each pixel location based on a pixel intensity threshold, as discussed herein (e.g., see method 600 for FIG. 6), as opposed to generating and comparing probability model frames (e.g., $PF_0$ and $PF_1$). For pixel intensity comparisons, the model unit 1130 generates model data 1132 based on pixel intensity values and the pixel comparator unit 1150, or similar module, generates an initial pixel intensity value frame (e.g., $PIV_0$) at the initial time $t_0$ and generates a subsequent pixel intensity value frame (e.g., $PIV_1$) at the subsequent time $t_1$. The pixel comparison unit 1150 then compares $PIV_0$ to $PIV_1$ to determine pixel category changes based on whether the change (e.g., the image differential 1152: $[PIV_1-PIV_0]$) in the pixel intensity values exceeds a pixel intensity threshold for each pixel location. For example, if the pixel intensity changes from $PIV_0$ at 38% to $PIV_1$ at 5% for a particular pixel location, the image intensity differential (e.g., $[PIV_1-PIV_0]$) would be −33%. Where if the pixel intensity changes more than a threshold (e.g., >30%), a depth category for that particular pixel location would be determined to have changed (e.g., the pixel location is determined to have changed from a background pixel to a foreground pixel, or vice versa).

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        obtaining a mask corresponding to at least a portion of a first image of a physical environment, the first image comprising pixels each having a value provided by a camera, the mask identifying pixels of the first image that are associated with a first depth category;
        generating a model based on the first image and the mask, the model based on occurrences of pixels associated with the first depth category that have a characteristic of a set of characteristics;
        determining, based on the model, a first probability that a pixel of the first image at a pixel location is associated with the first depth category based on which characteristic the pixel exhibits in the first image;
        determining, based on the model, a second probability that a pixel in a second image at the pixel location is associated with the first depth category based on which characteristic the pixel exhibits in the second image; and
        determining depth category changes of pixels from the first image to the second image of the physical environment based on pixels of the second image having characteristics of the set of characteristics and the model, wherein a depth category change at the pixel location is determined by comparing the first probability to the second probability.

2. The method of claim 1, wherein the first image and the second image each comprise a plurality of pixel locations, wherein each pixel in the first image and each pixel in the second image are located at one of the plurality of pixel locations, wherein pixel locations in the first image are spatially correlated and are aligned with pixel locations in the second image.

3. The method of claim 2, wherein determining depth category changes of pixels from the first image to the second image of the physical environment based on pixels of the second image having characteristics of the set of characteristics and the model comprises:
    determining a pixel intensity value for each pixel location in the first image and the second image;
    determining, for each pixel location, whether a change occurs in pixel intensity value from the first image to the second image; and
    determining, for each pixel location, whether a depth category changes from the first depth category to a second depth category based on whether the change in the pixel intensity value exceeds a pixel intensity threshold.

4. The method of claim 1, wherein determining depth category changes of pixels from the first image to a second image of the physical environment comprises determining which pixels change in the second image compared to the first image from pixel occlusion to pixel reveal, and pixel reveal to pixel occlusion.

5. The method of claim 1, wherein determining depth category changes of pixels from the first image to a second image of the physical environment comprises determining depth category changes from the first depth category to a second depth category.

6. The method of claim 5, wherein the first depth category is a foreground image and the second depth category is a background image.

7. The method of claim 1, wherein the mask comprises an occlusion mask that identifies an area of pixels in the first image that includes at least one object that is at least partially occluded by another object.

8. The method of claim 7, wherein the at least one object is a virtual object and the another object is a physical object.

9. The method of claim 1, further comprising providing a computer-generated reality (CGR) environment that includes virtual content and the physical environment.

10. The method of claim 9, wherein the CGR environment is provided on a head-mounted device (HMD).

11. A method comprising:
    at an electronic device having a processor:

obtaining a mask corresponding to at least a portion of a first image of a physical environment, the first image comprising pixels each having a value provided by a camera, the mask identifying pixels of the first image that are associated with a first depth category;

identifying, for the first image, a plurality of windows;

generating a model based on the identified windows in the first image and the mask, the model based on occurrences of pixels associated with the first depth category that have a characteristic of a set of characteristics; and determining depth category changes of pixels from the first image to a second image of the physical environment based on pixels of the second image having characteristics of the set of characteristics and the model, wherein each window in the first image is spatially correlated and is aligned with a corresponding window in the second image.

12. A method comprising:

at an electronic device having a processor:

obtaining a mask corresponding to at least a portion of a first image of a physical environment, the first image comprising pixels each having a value provided by a camera, the mask identifying pixels of the first image that are associated with a first depth category;

generating a model based on the first image and the mask, the model based on occurrences of pixels associated with the first depth category that have a characteristic of a set of characteristics, wherein generating the model based on the first image and the mask comprises identifying the occurrences of pixels associated with the first depth category that have a characteristic of the set of characteristics and a relationships between the pixels using a machine learning model that uses a representation of the first image and the mask as input; and determining depth category changes of pixels from the first image to a second image of the physical environment based on pixels of the second image having characteristics of the set of characteristics and the model.

13. The method of claim 12, wherein the machine learning model is a neural network.

14. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the device to perform operations comprising:

obtaining a mask corresponding to at least a portion of a first image of a physical environment, the first image comprising pixels each having a value provided by a camera, the mask identifying pixels of the first image that are associated with a first depth category;

generating a model based on the first image and the mask, the model based on occurrences of pixels associated with the first depth category that have a characteristic of a set of characteristics;

determining, based on the model, a first probability that a pixel of the first image at a pixel location is associated with the first depth category based on which characteristic the pixel exhibits in the first image;

determining, based on the model, a second probability that a pixel in a second image at the pixel location is associated with the first depth category based on which characteristic the pixel exhibits in the second image; and determining depth category changes of pixels from the first image to the second image of the physical environment based on pixels of the second image having characteristics of the set of characteristics and the model, wherein a depth category change at the pixel location is determined by comparing the first probability to the second probability.

15. The device of claim 14, wherein the first image and the second image each comprise a plurality of pixel locations, wherein each pixel in the first image and each pixel in the second image are located at one of the plurality of pixel locations, wherein pixel locations in the first image are spatially correlated and are aligned with pixel locations in the second image.

16. The device of claim 15, wherein determining depth category changes of pixels from the first image to the second image of the physical environment based on pixels of the second image having characteristics of the set of characteristics and the model comprises:

determining a pixel intensity value for each pixel location in the first image and the second image;

determining, for each pixel location, whether a change occurs in pixel intensity value from the first image to the second image; and determining, for each pixel location, whether a depth category changes from the first depth category to a second depth category based on whether the change in the pixel intensity value exceeds a pixel intensity threshold.

17. The device of claim 14, wherein determining depth category changes of pixels from the first image to a second image of the physical environment comprises determining which pixels change in the second image compared to the first image from pixel occlusion to pixel reveal, and pixel reveal to pixel occlusion.

18. A non-transitory computer-readable storage medium, storing program instructions computer-executable on a computer to perform operations comprising:

obtaining a mask corresponding to at least a portion of a first image of a physical environment, the first image comprising pixels each having a value provided by a camera, the mask identifying pixels of the first image that are associated with a first depth category;

generating a model based on the first image and the mask, the model based on occurrences of pixels associated with the first depth category that have a characteristic of a set of characteristics;

determining, based on the model, a first probability that a pixel of the first image at a pixel location is associated with the first depth category based on which characteristic the pixel exhibits in the first image;

determining, based on the model, a second probability that a pixel in a second image at the pixel location is associated with the first depth category based on which characteristic the pixel exhibits in the second image; and determining depth category changes of pixels from the first image to the second image of the physical environment based on pixels of the second image having characteristics of the set of characteristics and the model, wherein a depth category change at the pixel location is determined by comparing the first probability to the second probability.

* * * * *